United States Patent
Remer

(10) Patent No.: US 7,120,679 B2
(45) Date of Patent: Oct. 10, 2006

(54) CONFIGURATION OF HEADLESS DEVICES USING CONFIGURATION SERVICE

(75) Inventor: Eric B. Remer, American Fork, UT (US)

(73) Assignee: Intel Corporation, Santa Clara, CA (US)

( * ) Notice: Subject to any disclaimer, the term of this patent is extended or adjusted under 35 U.S.C. 154(b) by 679 days.

(21) Appl. No.: 09/893,733

(22) Filed: Jun. 29, 2001

(65) Prior Publication Data

US 2003/0005088 A1  Jan. 2, 2003

(51) Int. Cl.
*G06F 15/177* (2006.01)
(52) U.S. Cl. ............... 709/220; 709/221; 709/222; 370/254; 370/255; 370/256; 370/257; 370/258
(58) Field of Classification Search ........... 709/220, 709/221, 222
See application file for complete search history.

(56) References Cited

U.S. PATENT DOCUMENTS

| | | | |
|---|---|---|---|
| 6,286,038 B1* | 9/2001 | Reichmeyer et al. | 709/220 |
| 6,691,170 B1* | 2/2004 | Gitlin et al. | 709/245 |
| 6,754,767 B1* | 6/2004 | Gold | 711/114 |
| 6,895,499 B1* | 5/2005 | Frazier | 713/1 |
| 2002/0156898 A1* | 10/2002 | Poirier et al. | 709/227 |
| 2002/0161867 A1* | 10/2002 | Cochran et al. | 709/221 |
| 2004/0068576 A1* | 4/2004 | Lindbo et al. | 709/232 |

* cited by examiner

*Primary Examiner*—Fritz Fleming
*Assistant Examiner*—Niketa I. Patel
(74) *Attorney, Agent, or Firm*—Pillsbury Winthrop Shaw Pittman LLP

(57) ABSTRACT

An arrangement is provided for configuring a headless device. A self-initiated configuration mechanism within a headless device issues a configuration request to a configuration service mechanism across network, requesting a configuration specification corresponding to the headless device. The configuration service mechanism returns the requested configuration specification to the self-initiated configuration mechanism. Upon receiving the configuration specification, the self-initiated configuration mechanism configures the headless device according to the configuration specification.

15 Claims, 9 Drawing Sheets

CONFIGURATION OF HEADLESS DEVICES USING CONFIGURATION SERVICE

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to appliances and computers. Other aspects of the present invention relate to headless devices.

The use of a computer to perform a specific function is becoming more commonplace. Such a role of a computer is similar to the conventional role of an appliance. The boundary between an appliance and a computer is gradually blurring. The term "device" is now often used to refer to an appliance or a computer that performs a well-defined and specific function (as opposed to a generic function). In many ways, utilizing the concept of appliance can simplify a device and make it more manageable and more reliable.

More and more computers are being deployed headless. That is, they are manufactured and put in use without peripherals such as monitors, video cards, keyboards, mousses, floppy drives, and CD-ROM. Many headless computers have no means to input/output (I/O) and some have merely a network interface card. The lack of I/O capabilities causes some difficulty in configuring headless devices. For example, it is often inconvenient to even set up an initial configuration of an Internet Protocol (IP) address for a headless computer.

Currently, to configure a headless computer, it may require that the headless computer support some form of I/O, so that it can be connected to appropriate peripherals, through which configuration can be performed. Through such means, headless devices may be configured one at a time via the I/O peripherals. Such peripherals include a floppy drive, a Liquid Crystal Display (LCD), a serial port, a Universal Serial Bus (USB) and others. A configuration process carried out via such peripherals is often tedious, inefficient, and difficult. In addition, current configuration processes force a headless device to support I/O peripherals that may be used only once for initial configuration and then not needed during the service life of the headless device.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein.

DETAILED DESCRIPTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The processing described below may be performed by a general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
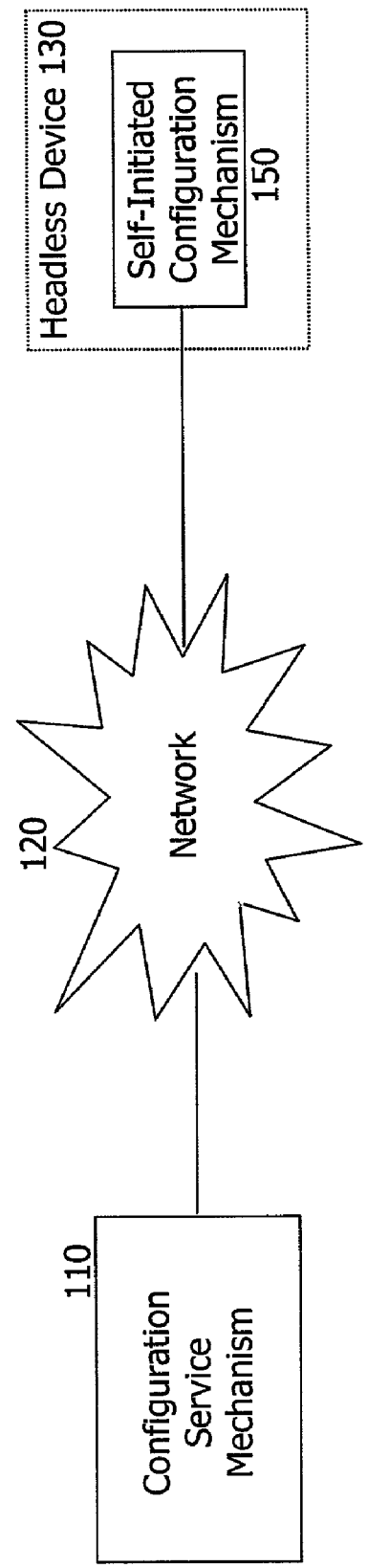
FIG. 1 is a high level architecture of embodiments of the present invention.

FIG. 1 depicts the high-level system architecture 100 of embodiments of the present invention. System 100 comprises a configuration service mechanism 110 and a headless device 130 that can connect to the configuration service mechanism 110 via a network 120. According to the present invention, the headless device 130 includes a self-initiated configuration mechanism 150 that configures the headless device through a configuration service provided by the configuration service mechanism 110. The self-initiated configuration mechanism 150 may be activated when the headless device 130 is initially powered up. Once being activated, the self-initiated configuration mechanism 150 sends a service request to the configuration service mechanism 110 for configuration service. The configuration service mechanism 110, upon receiving the service request from the headless device 130, may send an appropriate configuration specification back to the self-initiated configuration mechanism 150, which then configures the headless device 130 according to the configuration specification received from the configuration service mechanism 110.

The headless device 130 represents a generic device that may have no display screen or keys to enter input. A headless device may include a headless computer, a router, or a data storage device. The headless device 130 is capable of interacting with the outside world through the network 120 via some internal communication mechanism. The self-initiated configuration mechanism 150 in the headless device 130 may communicate with the configuration service mechanism 110 through such internal communication mechanism. Network 120 represents a generic network, which may include the Internet or a proprietary network.

The configuration service mechanism 110 offers configuration related services to a set of registered headless devices (only one such headless device is shown in FIG. 1). These services may include maintaining the configuration information of the registered headless devices and providing such information to the headless devices whenever it is needed. For example, the headless device 130 may be registered with the configuration service mechanism when it is deployed and its corresponding configuration specification may be stored, as part of the registration information, in the configuration service mechanism 110.

The configuration service mechanism 110 may register a headless device according some unique identification such as a device identification (e.g., serial number of a product) associated with the headless device. The configuration specification of the headless device may be stored and indexed using also the device identification. The configuration specification of a headless device may contain information about the configuration parameter values associated with the headless device. A configuration specification may be defined with respect to a single headless device or a group of headless devices. In the latter case, a same configuration applies to a plurality of headless devices. That is, all the headless devices in the same group are configured the same way.

The configuration service mechanism 110 may offer services through which a configuration specification may be defined through selecting configuration parameters which may be assigned with desired values. The configuration service mechanism 110 may also offer services that allow configuration specifications to be updated based on needs. In addition, the configuration service mechanism 110 may also provide certain authentication capabilities so that the process of configuring or updating a configuration specification of a headless device may be properly protected from any unauthorized configuration attempt.

Figure 2:
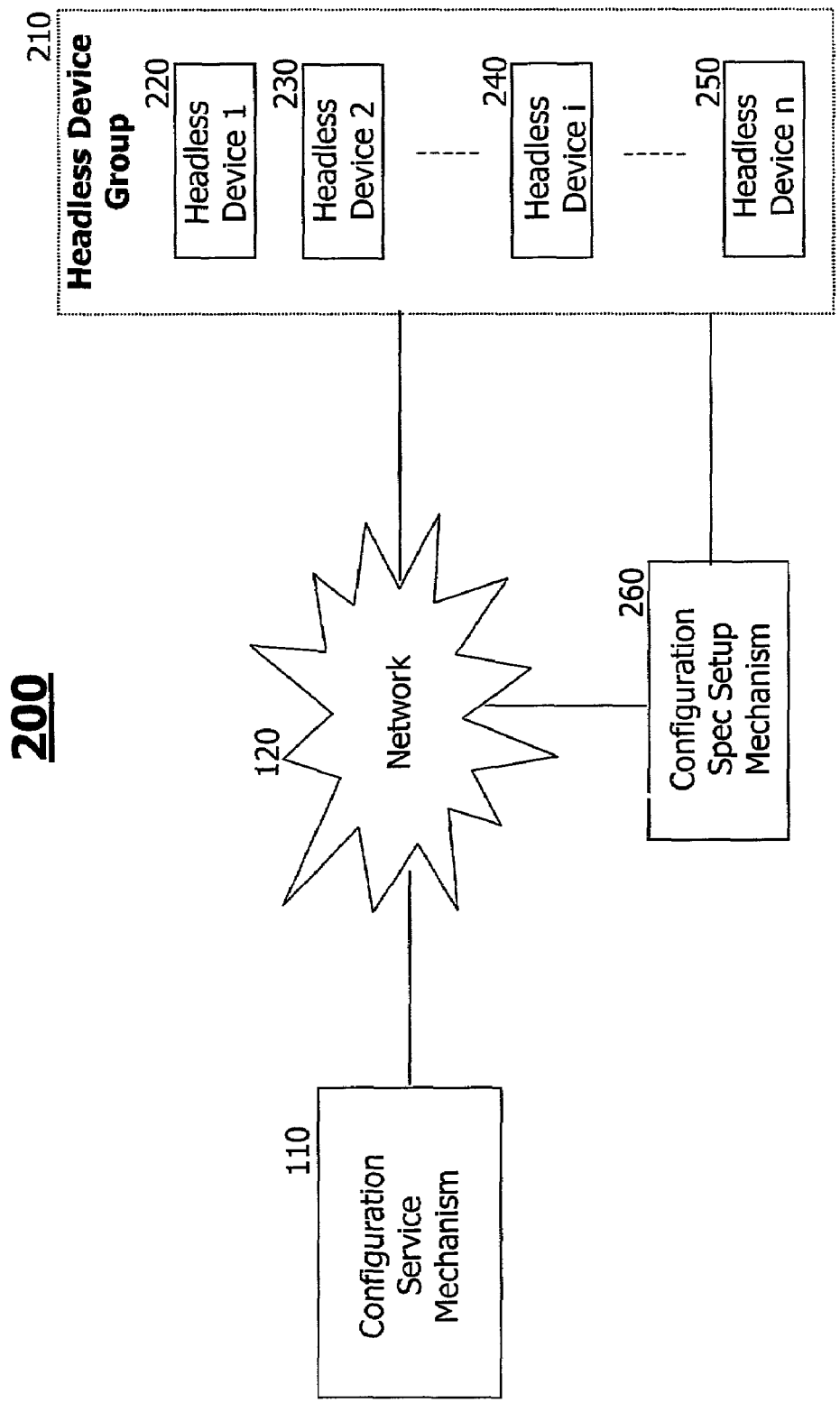
FIG. 2 is a high level architecture of a different embodiment of the present invention.

FIG. 2 describes a different embodiment of the present invention, in which a configuration specification setup mechanism 260 interacts with the configuration service mechanism 110 to set up configuration specifications for a headless device group 210. In FIG. 2, the headless device group 210 includes a set of n headless devices (220, 230, . . . , 240, . . . ,250). The headless devices in the headless device group 210 may correspond to a same type of headless devices produced by a same manufacturer or may be associated with different headless devices of a same user. Each of the headless devices in the headless device group 210 may have a unique device identification and similarly the headless device group 210 may also have its unique group identification.

In FIG. 2, the configuration specification setup mechanism 260 may correspond to a management mechanism that is responsible for registering the headless devices 220, 230, . . . , 240, . . . , 250 in the headless device group 210 and for setting up the corresponding configuration specifications of these headless devices with the configuration service mechanism 110. Registering a headless device may involve getting the device identification of the headless device recorded in the configuration service mechanism 110 and specifying the initial configuration specification of the registered headless device. The configuration specification setup mechanism 260 may also be responsible for updating an existing configuration specification of a registered headless device. Updating an existing configuration specification is discussed later with reference to FIGS. 8 and 9.

The configuration specification setup mechanism 260 may be associated with a product deployment center of a manufacturer, which registers manufactured headless devices with the configuration service mechanism 110 prior to sale of the products on the market. The registration of such products may use, for example, the corresponding product serial numbers as the unique device identifications. In this case, when a registered headless device is delivered (or sold) to a user and is powered up for the first time, the self-initiated configuration mechanism 130 (inside of the headless device) automatically connects to the configuration service mechanism 110, requests the configuration specification that has been set up for the headless device and configures the headless device according to the configuration specification.

The configuration specification setup mechanism 260 may also correspond to a user of a headless device. A user of a headless device may sometimes have the need to change the current configuration specification of the headless device via the configuration service mechanism 110. In this case, the configuration specification setup mechanism 260 (corresponding to the user) may connect to the configuration service mechanism 110 and request the service of updating an existing configuration specification of a registered headless device. To receive the service, the configuration specification setup mechanism 260 may provide the unique device identification of the headless device to the configuration service mechanism 110 and then specify the desired configuration specification to be used to replace the existing configuration specification.

The process of updating an existing configuration specification may be realized using different implementations. For example, the configuration service mechanism 110 may present a plurality of configuration choices given the device identification and let the user select one of the given configurations. It may also present the current configuration parameters and their presently assigned values and provide the means for the user to change the current setting. In both cases, update that is allowed with respect to an existing configuration specification may be limited according to the device identification. For example, a particular headless device may be configured in only three different ways. A user may be allowed to change only fixed types of configuration parameters.

To facilitate the management of registered configuration specifications, the configuration service mechanism 110 may also provide a service that allows the configuration specification setup mechanism 260 to set up a customer profile with respect to a registration. Such a customer profile may later be used to perform authentication or access authorization on a service request. For example, when the configuration specification setup mechanism 260 registers a headless device with the configuration service mechanism 110, it may set up a customer profile, indicating that any update made to the configuration specification of the headless device requires authentication using a password. A customer profile may also define the scope of allowed changes. For example, it may explicitly prevent some configuration parameters from being updated.

The configuration specification setup mechanism 260 may register an individual headless device or a plurality of headless devices (as shown in FIG. 2). In the latter case, all the headless devices in the same group (e.g., 210) may be configured using the same configuration specification. For example, a plurality of data storage devices may be deployed in the same data center, in which they may be all configured in the same way. The headless devices grouped this way may be reconfigured as a uniform group as well.

Figure 3:
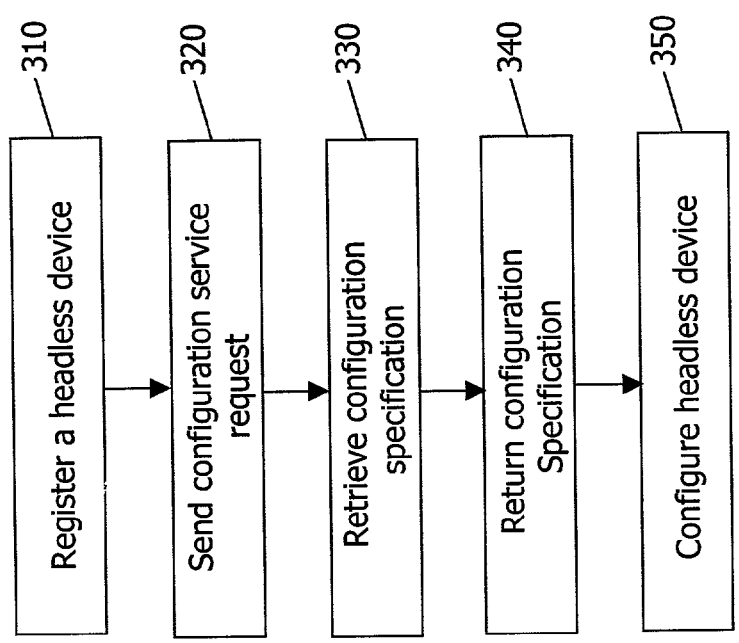
FIG. 3 is an exemplary flowchart of a process, in which a headless device is configured through a configuration service according to the present invention.

FIG. 3 is an exemplary flowchart of a process, in which a headless device (e.g., 130) is configured through its self-initiated configuration mechanism (e.g., 150) via configuration service mechanism 110. The headless device 130 is first registered, at act 310, with the configuration service mechanism 110. The registration may be based on the unique device identification of the headless device 130. An initial configuration specification of the headless device is also set up during the registration.

When the self-initiated configuration mechanism 150 in the headless device 130 is triggered (e.g., through powering up), it sends, at act 320, a configuration service request to the configuration service mechanism 110 via the network 120. The service request is sent with the device identification of the headless device 130. Upon receiving the configuration service request, the configuration service mechanism 110 retrieves, at act 330, the configuration specification corresponding to the headless device 130. The retrieval may be based on the given device identification. The retrieved configuration specification is sent, at act 340, back to the self-initiated configuration mechanism 150 of the headless device 130 and is then used to configure, at act 350, the headless device 130.

The self-initiated configuration mechanism 150 represents the headless device 130 and receives the configuration specification from the configuration service mechanism 110 across the network 120 using an address that is routable across the network 120. Such a routable address is determined prior to sending the service request to the configuration service mechanism 110 and is sent with the request as a return address.

Figure 4:
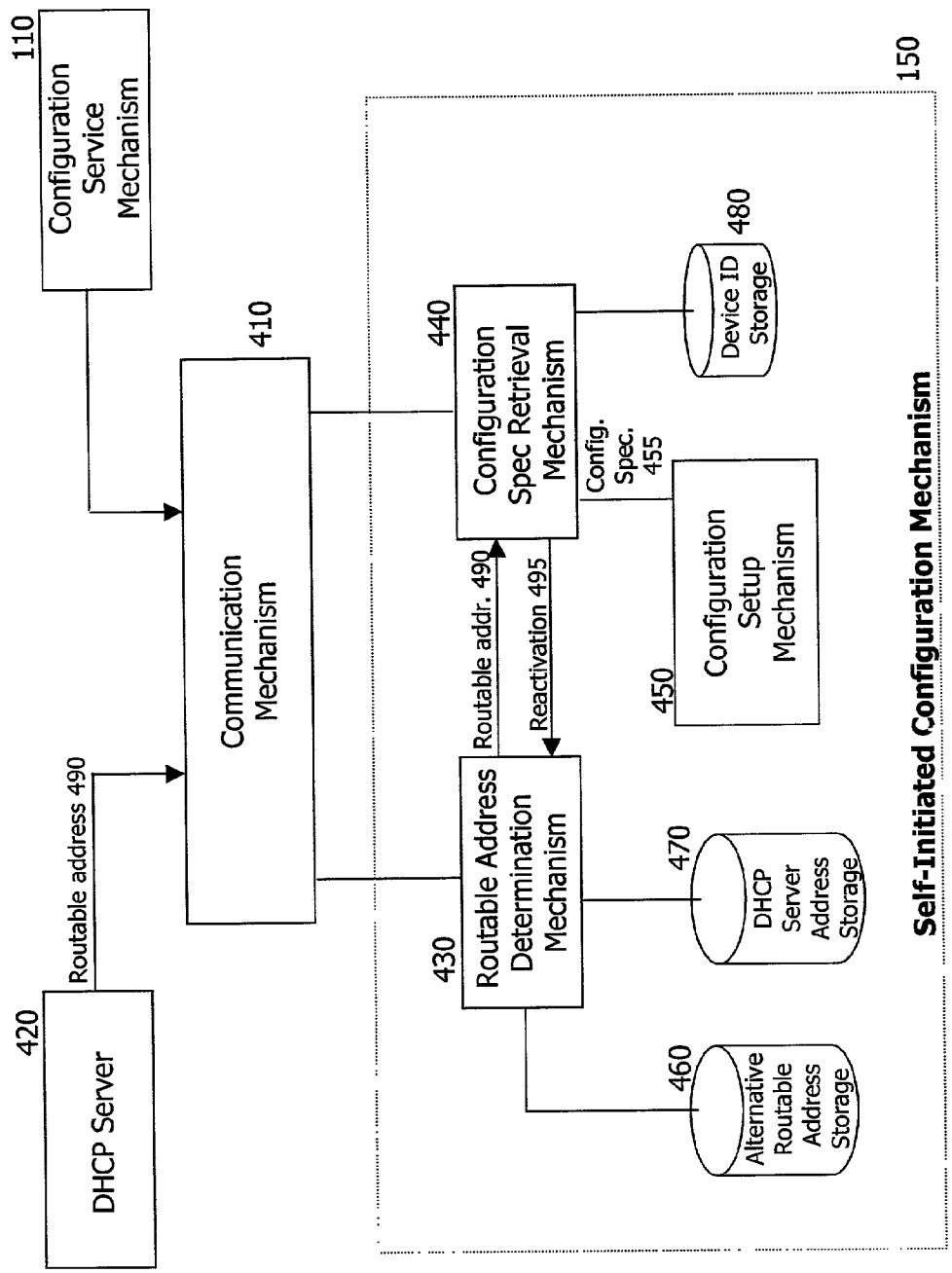
FIG. 4 depicts an exemplary internal structure of a self-initiated configuration mechanism in a headless device and the environment in which it operates, according to the present invention.

FIG. 4 depicts an exemplary internal structure of the self-initiated configuration mechanism 150 of the headless device 130 and the environment in which it operates, according to the present invention. In FIG. 4, the self-initiated configuration mechanism 150 comprises a routable address determination mechanism 430, a configuration specification retrieving mechanism 440, and a configuration setup mechanism 450. The routable address determination mechanism 430 first determines a routable address 490, and uses the routable address during the communication with the configuration service mechanism 110.

The self-initiated configuration mechanism 150 may determine the routable address 490 in different ways. For example, the routable address 490 may be obtained from a server that allocates Internet Protocol (IP) addresses via the Dynamic Host Configuration Protocol (DHCP). In this case, a DHCP server address may be pre-stored in a DHCP server address storage 470 in the headless device and retrieved whenever a routable address is to be determined. The routable address 490 may also be selected from a set of alternative routable addresses pre-stored in an alternative routable address storage 460.

Figure 5:
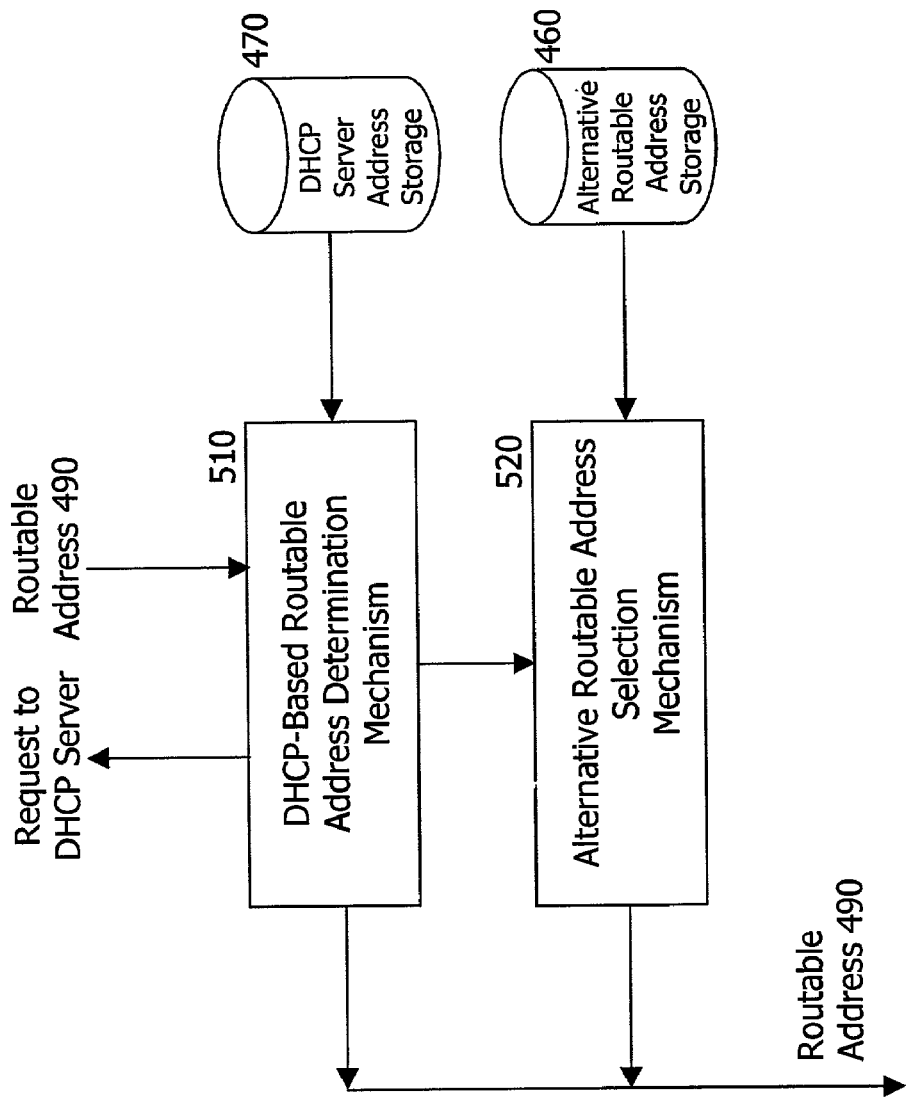
FIG. 5 depicts the internal structure of a routable address determination mechanism according to the present invention.

FIG. 5 describes an exemplary high-level functional block diagram of the routable address determination mechanism 430 that enables these different methods of determining a routable address. The routable address determination mechanism 430 comprises a DHCP-based routable address determination mechanism 510 and an alternative routable address selection mechanism 520. The former is connected to the DHCP server address storage 470 and retrieves the DHCP server address whenever a routable address is to be determined. Using the DHCP server address, the DHCP-based routable address determination mechanism 510 sends a request for a routable address to a DHCP server 420 (shown in FIG. 4). The DHCP server 420, upon receiving the request for a routable address, determines a routable address and sends the routable address back to the DHCP-based routable address determination mechanism 510 via the communication mechanism 410.

The alternative routable address selection mechanism 520 may be activated when the DHCP server address is not available. A set of alternative routable addresses may be pre-stored in the alternative routable address storage 460 and the alternative routable address selection mechanism 520 may be capable of selecting one of the pre-stored alternative routable addresses according to certain criterion. Such a criterion may be set up according to, for example, the obscurity of the address. The more infrequent an address is being used, the less likely that it will cause collision. Each alternative address in the alternative routable address storage 460 may be weighted according to the criterion. For instance, the more obscure an address is, the higher the weight of the address may be. In selecting an alternative routable address, the routable address determination mechanism 430 may select the one that is weighted the highest.

Referring again to FIG. 4, the routable address 490, once determined, is sent to the configuration specification retrieval mechanism 440, which requests the configuration service mechanism 110 to retrieve a configuration specification corresponding to a headless device and receives the configuration specification once it is retrieved.

Figure 6:
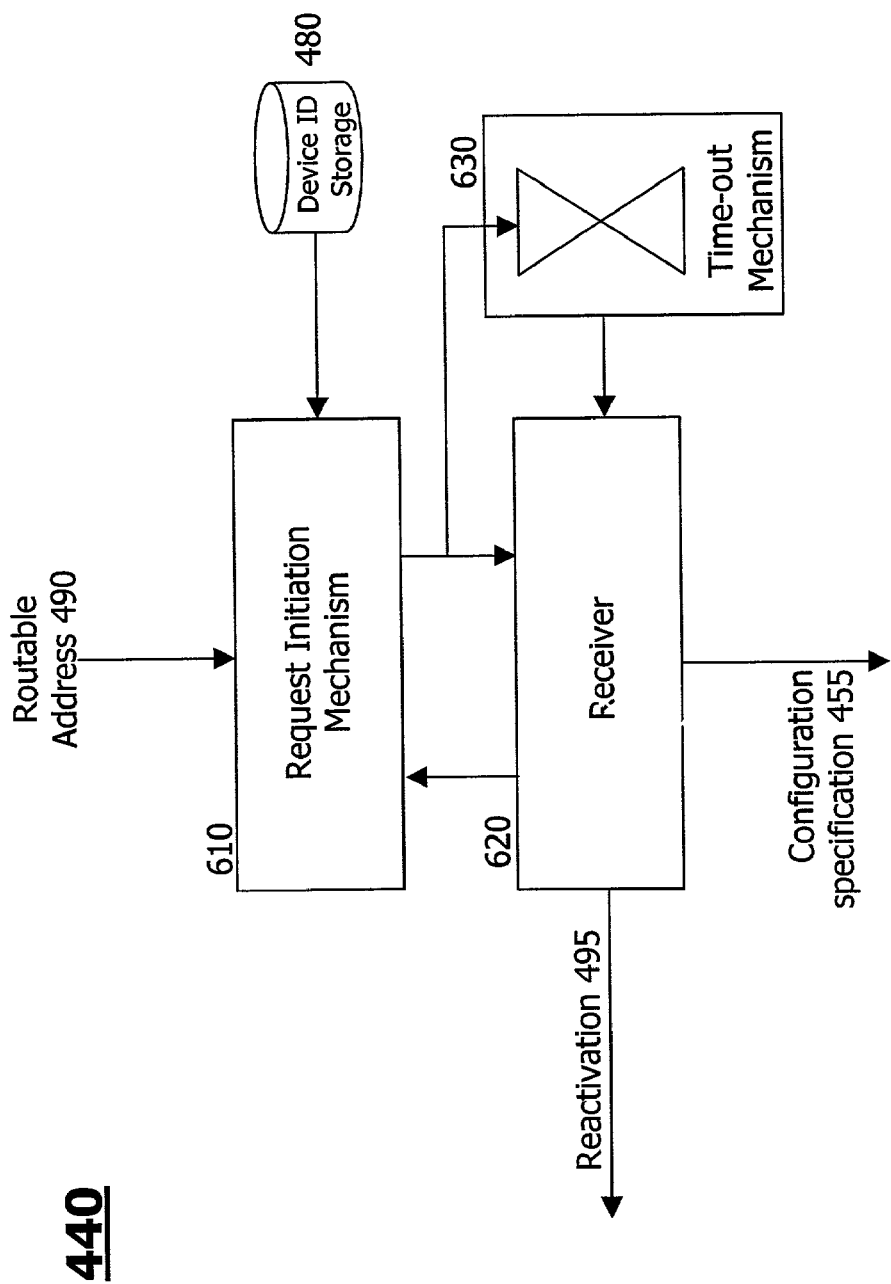
FIG. 6 depicts the internal structure of a configuration specification retrieval mechanism according to the present invention.

FIG. 6 depicts an exemplary internal structure of the configuration specification retrieval mechanism 440. The configuration specification retrieval mechanism 440 comprises a request initiation mechanism 610, a receiver 620, and a time-out mechanism 630.

The request initiation mechanism 610 takes the routable address 490 as input and retrieves the device identification of the underlying headless device from a device identification storage 480. The retrieved device identification is used to construct the service request, which is then sent to the configuration service mechanism 110 with the routable address as the receiving address of the requested configuration specification. Once the request is sent out, the request initiation mechanism 610 may activate both the receiver 620 and the time-out mechanism 630 to start a time out control (over the receiver 620).

The time out mechanism 630 may enforce time out control according to some pre-specified time out condition. For example, a time out condition may specify a fixed length of time such as 30 seconds. Time out control over the receiver 620 may be necessary due to different reasons. For instance, if the configuration service mechanism 110 is not responding the service request, it may be that the routable address, currently used as the return address and selected from a set of alternative routable addresses, causes a collision. In this case, a new alternative routable address may have to be selected, after a time out, to avoid a collision.

If the receiver 620 does not receive the requested configuration specification within time out, it sends a reactivation signal 495 to either the alternative routable address selection mechanism 520, if the current routable address is selected from alternative routable addresses, or the request initiation mechanism 610, if the current routable address is obtained from the DHCP server 420. In the former case, a new routable address is to be selected and used to re-issue a service request to avoid further collision. In the latter case, the service request is simply repeated. When the receiver 620 receives the configuration specification, it activates the configuration setup mechanism 450 (FIG. 4) that configures the headless device according to the received configuration specification.

Figure 7:
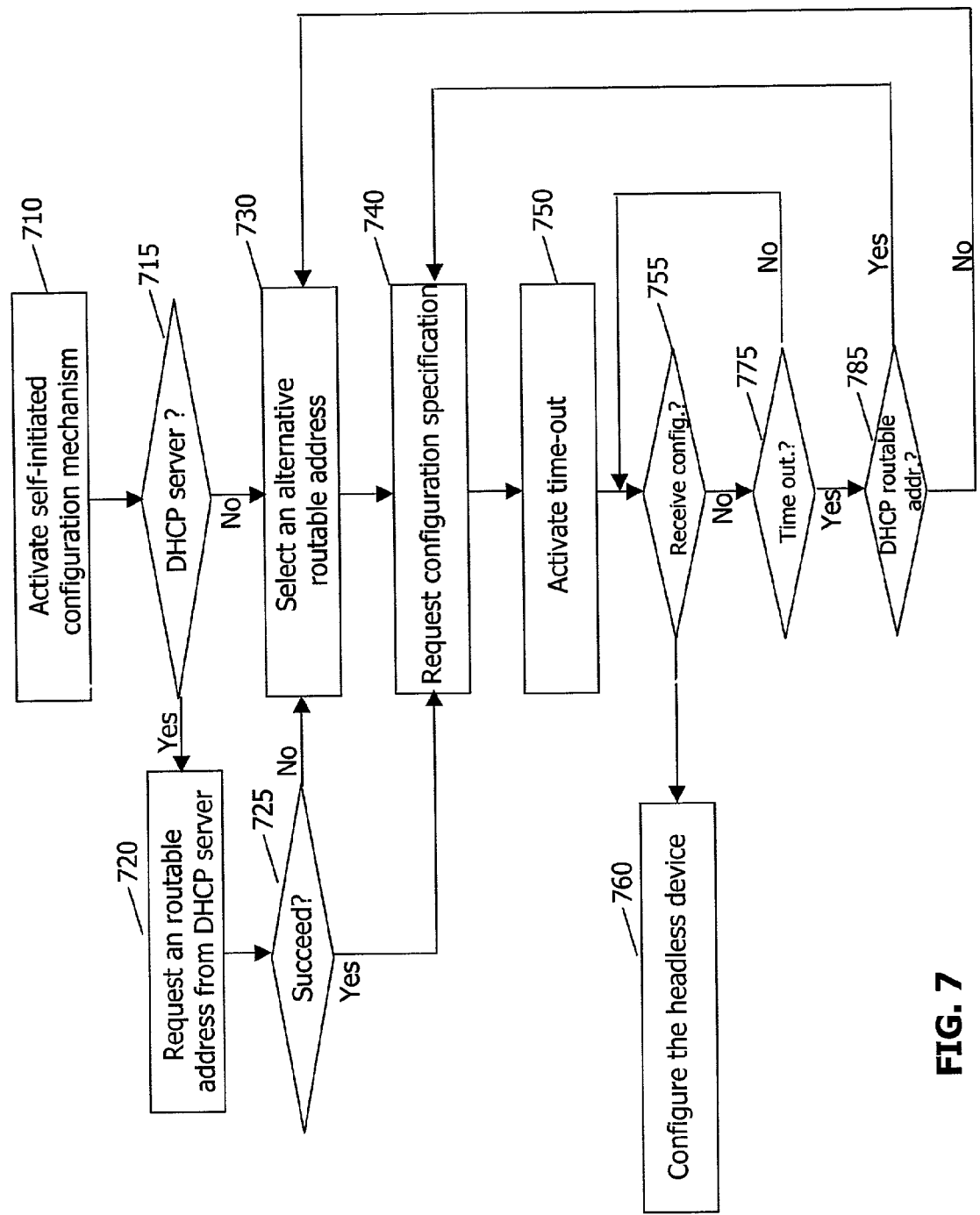
FIG. 7 is an exemplary flowchart of a process, in which a self-initiated configuration mechanism in a headless device configures the headless device based on a configuration specification forwarded from a configuration service.

FIG. 7 is an exemplary flowchart of a process, in which the self-initiated configuration mechanism 150 of the headless device 130 configures the headless device based on a configuration specification received from a configuration service. The self-initiated configuration mechanism 150 is first activated at act 710. The initial activation of configuring a headless device may be triggered during powering up the headless device. A headless device may also be re-configured after its initial configuration. For example, the requirement for configuration may change. In this case, the configuration specification setup mechanism 210 (FIG. 2) may first connect to the configuration service mechanism 110 to update the configuration specification of the headless device and then activate the self-initiated configuration mechanism 150 to re-configure the headless device via the configuration service mechanism 110.

Once activated, the self-initiated configuration mechanism 150 examines, at act 715 whether a DHCP server address can be retrieved from the headless device. If the DHCP server address can be retrieved, the self-initiated configuration mechanism 150 sends, at act 720, a request to the DHCP server address to request a routable address. If the self-initiated configuration mechanism 150 succeeds to obtain a routable address from the DHCP server, determined at act 725, it sends a configuration service request, at act 740, to the configuration service mechanism 110 with the device identification of the headless device and the routable address obtained from the DHCP server.

When the DHCP server address can not be retrieved from the headless device, determined at act 715, the self-initiated configuration mechanism 150 selects, at act 730, a routable address from a set of alternative routable addresses. With this selected alternative routable address, the self-initiated configuration mechanism 150 sends, at act 740, a configuration service request to the configuration service mechanism 110, with the device identification of the headless device.

Once the configuration service request is sent, a time out mechanism is activated at act 750. During the length of time controlled by the time out mechanism, the self-initiated configuration mechanism 150 examines, at act 755, whether the requested configuration specification is received. If the configuration specification is received, the self-initiated configuration mechanism 150 configures, at act 760, the headless device according to the received configuration specification.

If the configuration specification is not received during the time specified by the time out control, determined at act 775, the configuration service request may need to be re-issued. The new service request may be constructed differently, depending on how the previous service request is made. If the previous routable address sent with the previous request is obtained from the DHCP server, determined at act 785, the self-initiated configuration mechanism 150 simply sends the same service request to the configuration service mechanism 110. That is, it uses the same routable address from the DHCP server as a return address for requested configuration specification.

If the previous service request is sent with an alternative routable address, selected from a set of pre-stored alternative routable addresses, the self-initiated configuration mechanism 150 returns to act 730 to select a different alternative routable address and uses the newly selected alternative routable address to repeat the service request at act 740. Selecting a different alternative routable address may be necessary because not receiving the requested configuration specification from the configuration service mechanism 110 may be due to a collision caused by the previously selected alternative routable address.

Figure 8:
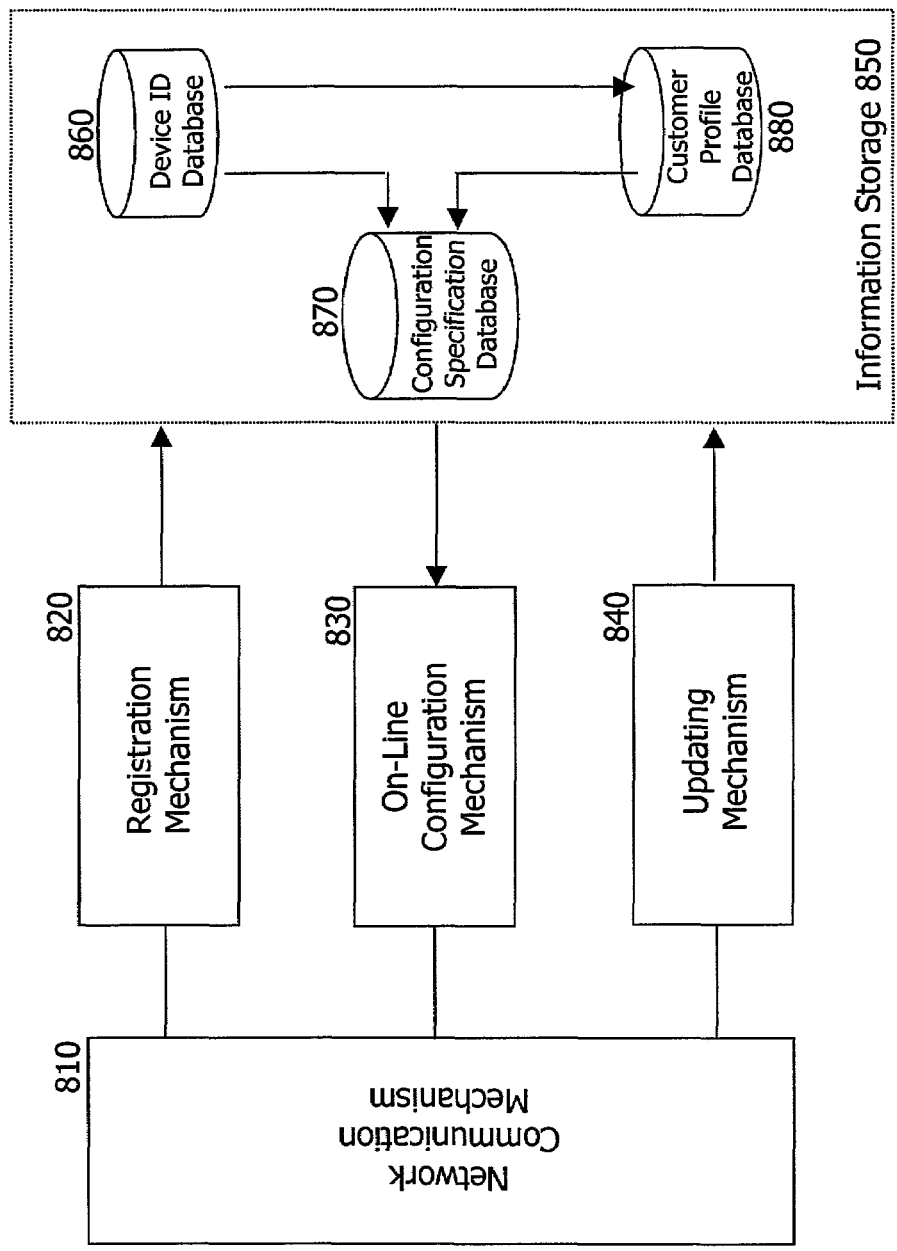
FIG. 8 depicts the internal structure of a configuration service mechanism according to the present invention.

FIG. 8 depicts an exemplary internal structure of the configuration service mechanism 110, which comprises a network communication mechanism 810, a registration mechanism 820, an on-line configuration mechanism 830, an updating mechanism 840, and an information storage 850. The network communication mechanism 810 facilitates the communication needs of the configuration service mechanism 110 across the network 120 (FIG. 2). For instance, it allows the configuration service mechanism 110 to communicate with the configuration specification setup mechanism 260 to initialize and to update configuration specifications of headless devices and to collaborate with the self-initiated configuration mechanism of a headless device to configure the headless device.

The registration mechanism 820 is responsible for registering headless devices. It may interact with the configuration specification setup mechanism 260 via the network communication mechanism 810. During initial registration, a device identification and a corresponding configuration specification of a headless device are sent to the registration mechanism 820. To register the corresponding headless device, the registration mechanism 820 may store the configuration specification in a configuration specification database 860 and the device identification in a device ID database 850. Indices between the device identifications stored in the device ID database 850 and the configuration specifications stored in the configuration specification database 860 may be established so that individual configuration specifications can be more efficiently retrieved based on given device identifications.

During initial registration of a headless device, a customer profile may also be set up to define access authorization requirement with respect to accessing registered information. A customer profile may also define the scope of update with respect to individual configuration specifications. For example, only limited configuration parameters may be specified in a customer profile as being changeable. A manufacturer of a headless device may impose such limitation and may set up, when a product is deployed, a corresponding customer profile to define such limitations during the process of initial registration of the headless device. A customer profile may be applied to check the authorization or the validity of an update request whenever the underlying configuration specification is to be updated.

Once a headless device is registered (i.e., its device identification is stored and corresponding configuration specification is initialized), the on-line configuration mechanism 830 in the configuration service mechanism 110 is ready to provide on-line configuration service to the underlying headless device. When the self-initiated configuration mechanism of a registered headless device sends a service request, the on-line configuration mechanism 830 intercepts the request with a device identification and a routable address.

Based on the received device identification, the on-line configuration mechanism 830 identifies the stored device identification. The identification process is to verify that the headless device has been registered (i.e., its configuration specification is accessible). Using the verified device identification, the on-line configuration mechanism 830 retrieves the requested configuration specification. The retrieved configuration specification is then sent to the given routable address.

The updating mechanism 840 is responsible to facilitate the service needs of updating existing configuration specifications of registered headless devices. Such needs may arise due to different reasons. For example, revision to an existing protocol based on which a headless device communicates may require reconfiguring the headless device. A request to update an existing configuration specification may be initiated by the configuration specification setup mechanism 260. The request may be issued with a device identification, which is used to locate the existing configuration specification in the configuration specification database 860.

When the updating mechanism 840 receives an updating request with a device identification, certain access authorization verification may be applied. This may depend on how the customer profile of the corresponding headless device is initially setup during the registration process. The verification may include checking whether updating the configuration specification of the underlying headless device is allowed and who is allowed to perform the update (e.g., with what level of authorization). If it is allowed, what configuration parameters are allowed to be changed and what are not.

A configuration specification may specify a set of configuration parameters and their corresponding values. Updating an existing configuration specification may involve changes of configuration parameter values. Different implementations may be adopted to realize an updating process. For example, the updating mechanism 840 may retrieve an existing configuration specification using received device identification, display current configuration parameter values, and provide the means to accept new configuration parameter values. The updating mechanism 840 may also offer different alternative configuration specifications as possible choices so that one of which may be selected to replace the existing configuration.

Figure 9:
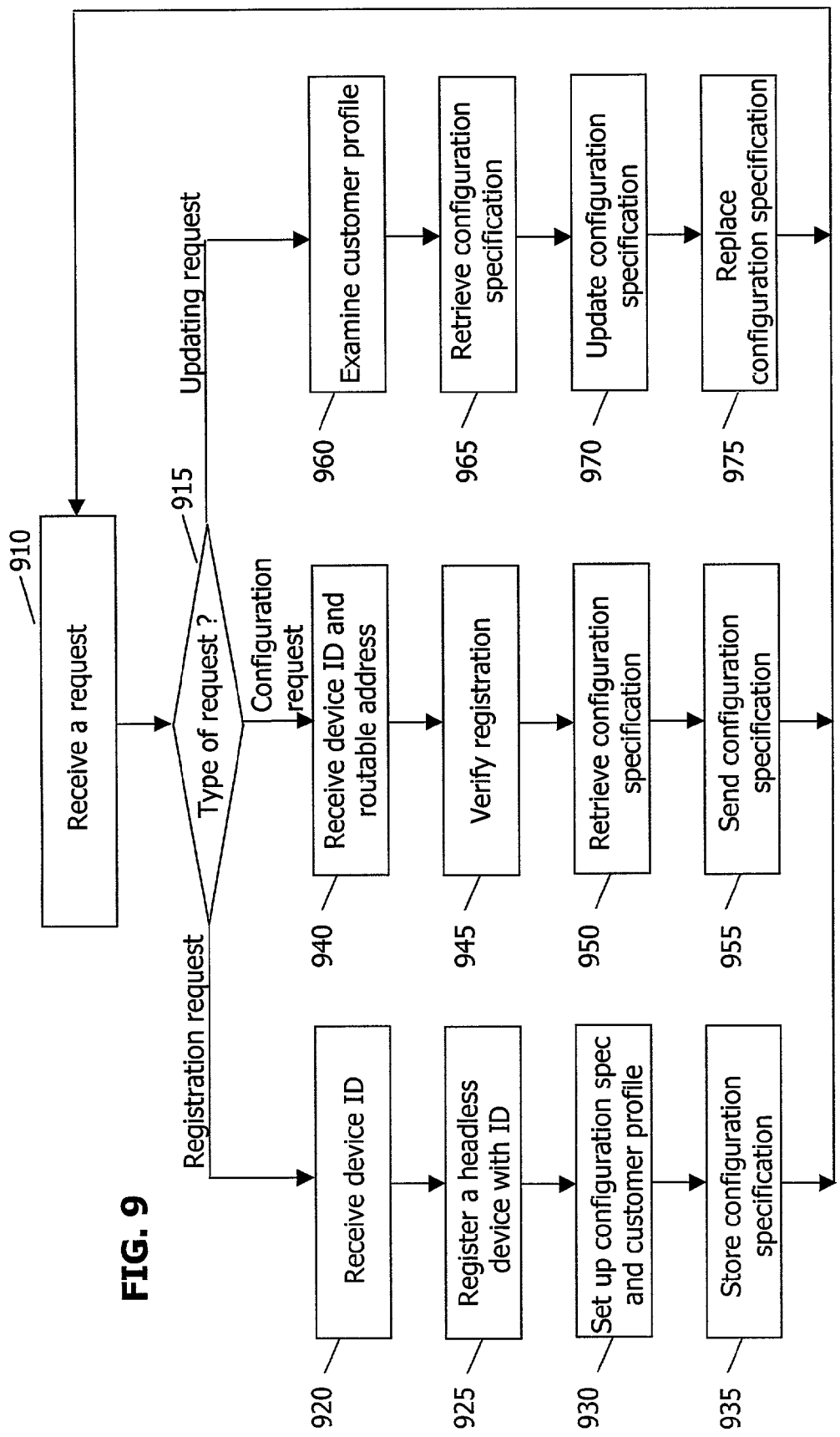
FIG. 9 is an exemplary flowchart of a process, in which a configuration service mechanism facilitates different types of services related to configuration of a headless device, according to the present invention.

FIG. 9 is an exemplary flowchart of a process, in which the configuration service mechanism 110 facilitates different types of services that are related to configuring a headless device. A service request is received at act 910. Depending on the type of the request, determined at act 915, the configuration service mechanism 110 performs different functions. If received request is for registering a headless device, the configuration service mechanism 110 receives, at act 920, a device identification, corresponding to an underlying headless device, with the request. In this case, the configuration service mechanism 110 registers, at act 925, the underlying headless device using its device identification. The initial configuration specification for the headless device is then set up at act 930. The initial configuration specification of the headless device may be received together with the request or may be set up in an interactive process. A customer profile may also be set up at act 930. The initial configuration specification is finally stored, at act 935, in the configuration specification database 860 with, for example, proper index based on the device identification.

When the request is a configuration request, the configuration service mechanism 110 receives, at act 940, a device identification, corresponding to an underlying headless device, and a routable address with the request. In this case, the request is issued by a self-initiated configuration mechanism of a headless device, requesting the configuration service mechanism 110 to retrieve, based on the given device identification, the corresponding configuration specification and to send the retrieved specification to the routable address. Upon receiving the device identification, the configuration service mechanism 110 verifies, at act 945, the registration of the headless device using the given device identification. Once verified, the corresponding configuration specification is retrieved, at act 950, and sent, at act 955, to the given routable address.

When the request is for updating an existing configuration specification of a registered headless device, the configuration service mechanism 110 may examine, at act 960, the access authorization information stored in the customer profile, if any, of the headless device. If the access request is authorized, the configuration service mechanism 110 retrieves, at act 965, the existing configuration specification corresponding to the given device identification (received with the request). The retrieved configuration specification is updated, at act 970, and used to replace, at act 975, the existing configuration specification.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A method for configuring a headless device, comprising:

retrieving a pre-stored DHCP address from DHCP address storage in the headless device;

transmitting a request to the DHCP server using the pre-stored DHCP address to obtain a routable address for the headless device;

sending, by a self-initiated configuration mechanism in the headless device, a configure service request to a configuration service mechanism across a network, the service request asking for a configuration specification corresponding to the headless device, the headless device being identified by the routable address;

receiving from the configuration service mechanism, the configuration specification to the self-initiated configuration mechanism at the headless device; and configuring, by the self-initiated configuration mechanism in the headless device, the headless device according to the configuration specification received from the configuration service mechanism.

2. The method according to claim 1, further including:

registering the headless device, prior to the sending, with the configuration service mechanism using a device identification of the headless device.

3. The method according to claim 2, wherein the registering includes:

receiving, by the configuration service mechanism from a configuration specification set-up mechanism, a request to set up the configuration specification of the headless device, the request including the device identification;

recording the device identification of the headless device to register the headless device; and storing the configuration specification of the headless device.

4. The method according to claim 1, further including:

receiving a request to update the existing configuration specification of a headless device, the request including a device identification of the headless device;

updating the existing configuration specification of the headless device according to the request to generate updated configuration specification; and replacing the existing configuration specification with the updated configuration specification.

5. The method of claim 1, wherein the headless device is a device which has no means to receive user input except for a network interface card.

6. A headless device, comprising:

a DHCP server address storage to store a DHCP server address;

a communication mechanism for performing communications;

a routable address determination mechanism to retrieve the DHCP server address from storage and to utilize the communication mechanism to obtain a routable address from the DHCP server;

a self-initiated configuration mechanism, within the headless device, for configuring the headless device via a configuration service mechanism through the communication mechanism by sending a configure service request to a configuration service mechanism across a network, the service request asking for a configuration specification corresponding to the headless device and receiving the configuration specification from the configuration service mechanism, the headless device being identified by the routable address.

7. The device according to claim 6, wherein the self-initiated configuration mechanism includes:

a configuration specification retrieval mechanism for retrieving the configuration specification from the configuration service mechanism using a device identification, associated with the headless device, and the routable address; and a configuration set up mechanism for configuring the headless device based on the configuration specification received from the configuration service mechanism.

8. The device according to claim 7, wherein the configuration specification retrieval mechanism includes:

a request initiation mechanism for initiating a request to the configuration service mechanism to retrieve the configuration specification based on the device identification, the request being sent with the device identification and the routable address, to where the retrieved configuration specification is sent; and a receiver for receiving, after the request is sent, the configuration specification from the configuration service mechanism.

9. The device according to claim 8, further including:

a time out mechanism for controlling the receiver to receive the configuration specification within a length of time determined according to a time out condition.

10. The headless device of claim 6, wherein the headless device is a device which has no means to receive user input except for a network interface card.

11. A computer-readable medium encoded with a program for configuring a headless device, the program, when executed, causing:

retrieving a pre-stored DHCP address from DHCP address storage in the headless device;

transmitting a request to the DHCP server using the pre-stored DHCP address to obtain a routable address for the headless device;

sending, by a self-initiated configuration mechanism in a headless device, a configure service request to a configuration service mechanism across a network, the service request asking for a configuration specification corresponding to the headless device, the headless device being identified by the routable address;

receiving from the configuration service mechanism, the configuration specification to the self-initiated configuration mechanism, at the headless device; and configuring, by the self-initiated configuration mechanism in the headless device, the headless device according to the configuration specification received from the configuration service mechanism.

12. The medium according to claim 11, wherein the program causes, when executed:

receiving, prior to the sending, a request to register the headless device and its corresponding configuration specification using a device identification sent with the request;

recording the device identification of the headless device; and storing the configuration specification of the headless device.

13. A method for configuring a headless device, comprising:

requesting, from a DHCP server, a routable IP address;

selecting a stored routable IP address from an alternative routable address storage at the headless device if the requesting of the routable IP address from the DHCP server was not successful;

sending, by a self-initiated configuration mechanism in the headless device, a configure service request to a configuration service mechanism across a network, the service request asking for a configuration specification corresponding to the headless device; and receiving from the configuration service mechanism, the configuration specification to the self-initiated configuration mechanism at the headless device and configuring the headless device according to the configuration specification.

14. A computer-readable medium encoded with a program for configuring a headless device, the program, when executed, causes the headless device to:

request, from a DHCP server, a routable IP address;

select a stored routable IP address from an alternative routable address storage at the headless device if the requesting of the routable IP address from the DHCP server was not successful;

send, by a self-initiated configuration mechanism in the headless device, a configure service request to a configuration service mechanism across a network, the service request asking for a configuration specification corresponding to the headless device; and receive from the configuration service mechanism, the configuration specification to the self-initiated configuration mechanism at the headless device and configuring the headless device according to the configuration specification.

15. A headless device, comprising:

an alternative routable address storage, located within the headless device, for storing an alternative routable address;

a routable address determination mechanism for requesting a routable address from a DHCP server and for retrieving an alternative routable address from the alternative routable address storage on the headless device if the requesting of the routable address from the DHCP server was not successful from the DHCP server; and a self-initiated configuration mechanism, within the headless device, for configuring the headless device via a configuration service mechanism through the communication mechanism by sending a configure service request to a configuration service mechanism across a network, the service request asking for a configuration specification corresponding to the headless device and receiving the configuration specification from the configuration service mechanism, the headless device being identified by the routable address.

* * * * *